3,208,857
FLUID SHORTENING FOR CREAM ICINGS
Norman Bratton Howard, Hamilton, and Paul Martin Koren, Cincinnati, Ohio, assignors to The Procter & Gamble Company, Cincinnati, Ohio, a corporation of Ohio
No Drawing. Filed Dec. 28, 1962, Ser. No. 247,861
11 Claims. (Cl. 99—123)

This invention relates to novel shortening compositions. More particularly, it relates to a fluid shortening which is capable of producing stable, aerated icings which are equal to or better than those prepared with a conventional plastic shortening.

Icings are coatings which can be applied to cakes, sweet rolls, cookies, pastries, and other baked goods and confections. Although the basic ingredients of icings, as is well known, are sugar and water, the properties and characteristics of icings can be modified by variation of the constituents and additives used in connection with the basic sugar and water.

Certain types of icings, generally known as cream or butter-cream icings, contain a substantial proportion of fat or shortening and can be whipped to incorporate a large volume of air. It is the customary practice to use a plastic or solid shortening for preparing such cream-type icings, since the conventional liquid or fluid shortenings have not been able to impart the desired properties to them. Icings made with the conventional fluid shortenings tend to slump and bleed liquids, and do not have the air incorporation propetries of the common plastic shortenings. Even the addition of the ordinary plastic shortening emulsifiers, such as the mono- and diglycerides of higher fatty acids, does not of itself significantly affect the cream icing performance of a fluid shortening.

It is, therefore, a primary object of this invention to prepare an improved fluid shortening which can be used to make stable cream-type icings.

In accordance with the present invention it has been found that excellent stabilization of high-volume, aerated, cream-type icings is obtained with a fluid shortening by incorporating therein a stabilizer combination consisting of hydrogenated vegetable phosphatide and at least one surface active adjuvant selected from the group consisting of
(a) Edible high molecular weight saturated carboxylic acids,
(b) Esters or condensation products of edible low molecular weight hydroxy compounds and said carboxylic acids,
(c) Acid anhydrides of edible high molecular weight acidic lipids, and
(d) Edible high molecular weight saturated fatty alcohols.

The base oil of the fluid shortening of this invention is a normally liquid triglyceride. Suitable base oils for this invention can be derived from animal, vegetable, or marine sources including naturally occurring liquid triglyceride oils such as cottonseed oil, soybean oil, rapeseed oil, safflower oil, sesame seed oil, sunflower seed oil, and sardine oil. Also, suitable liquid oil fractions can be obtained from palm oil, lard, and tallow, as for example, by fractional crystallization or directed interesterification, followed by separation of the oil. Oils predominating in glycerides of unsaturated acids may require partial hydrogenation to maintain flavor. Refined, bleached cottonseed oil and refined and partially hydrogenated soybean oil (iodine value of about 110±10) have been found to be very suitable for use as glyceride base oils of this invention.

The stabilizer combination comprising the hydrogenated vegetable phosphatide and at least one surface active adjuvant is added to the fluid shortening in a small but sufficient amount to improve the creaming properties of the shortening and enable the preparation of stable, aerated icings therefrom. It has been found that each of the two components of the stabilizer combination should be added to the base oil in amounts of from about 1% to about 12% so that their total weight in the shortening does not exceed about 16%. All percentages mentioned herein are by total weight of the shortening composition, unless otherwise stated.

The hydrogenated vegetable phosphatide is an ordinary vegetable phosphatide, such as soya lecithin, which has been substantially hydrogenated to an iodine value of less than about 30 and preferably to less than about 15. The hydrogenation can be conducted by various means, e.g., such as contacting the phosphatide with hydrogen in the presence of a catalyst with or without solvents at elevated temperatures and pressures. Examples of suitable methods of hydrogenation are described in U.S. Patent 2,870,179, granted to Jacini, January 20, 1959; U.S. Patent 2,907,777, granted to Cole, October 6, 1959; and U.S. Patent 3,026,341, granted to Davis, March 20, 1962.

An example of a vegetable phosphatide which can be used in the practice of this invention is commercial lecithin which has been hydrogenated to an iodine value of about 15. Commercial lecithin is derived principally from soybeans and is a crude phosphatide material which generally contains on the order of about 60% to 70% phosphatides and about 30% to 40% oil. This crude material contains not only lecithin, but also associated phosphatides such as cephalin and inositide. The individual phosphatides, such as the pure compound lecithin, can also be hydrogenated to form suitable materials for this invention.

Although crude soybean oil is known to contain as much as 2% phosphatides which, for certain purposes, can be hydrogenated simultaneously during the hydrogenation of soybean oil to form a plastic product, it is necessary according to the present invention to use predetermined amounts of hydrogenated phosphatides in a given amount of the fluid base oil of the shortenings described herein. Simultaneous hydrogenation of the crude oil and phosphatide also produces a darkened material which is unsuitable for an edible fluid shortening.

The edible surface active adjuvant includes edible high molecular weight saturated carboxylic acids, esters or condensation products of said carboxylic acids with edible low molecular weight hydroxy compounds, acid anhydrides of edible high molecular weight acidic lipids and edible high molecular weight saturated fatty alcohols. As used herein, the term "condensation product" is intended to cover the reaction product in which ester groups form as a result of the reaction of the recited components. The surface active adjuvants simultaneously satisfy certain conditions specified hereinafter:

(1) They contain, per molecule, 1 to 6 lipophilic groups, such as saturated and olefinically unsaturated aliphatic hydrocarbon radicals having from about 13 to about 21 carbon atoms; and (2) They contain, per molecule, 0 to 2 free carboxyl groups, 0 to 4 free hydroxyl groups, 0 to 1 acid anhydride group derived from the linking together of 2 carboxyl groups, and 0 to 10 carboxylate groups derived from the linking together of carboxyl and hydroxyl groups.

The said surface active adjuvants can be described by the general formula as follows:

(I) 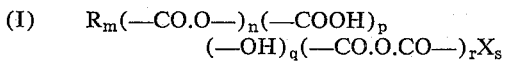

wherein:

R is selected from the group consisting of saturated and olefinically unsaturated hydrocarbon radicals having from about 13 to about 21 carbon atoms;

X is a residue having from 1 to 6 carbon atoms derived from at least one member of the group consisting of mono- and polyhydric alcohol, mono- and polycarboxylic acid, and hydroxy mono- and polycarboxylic acid, The letters $m$, $n$, $p$, $q$, $r$, and $s$ represent the following integers:

$m=1$ to 6; $n=0$ to 10; $p=0$ to 2; $q=0$ to 4; $r=0$ to 2; $s=0$ to 6; and at least one of $n$, $p$, $q$, $r$ and $s$ is at least one.

Although the above general formula is written in terms of monomeric compounds, it will be understood that polymeric material is included within the scope of this invention as hereinafter described.

The classes of substances set forth below by way of example illustrate various materials that, in accordance with the invention, provide suitable surface active adjuvants, but the invention is not to be limited to these specific classes of substances.

(a) A saturated fatty acid having from about 14 to about 22 carbon atoms;

(b) The condensation product of saturated fatty acid having from about 14 to about 22 carbon atoms with a monohydroxy-monocarboxylic acid having from 2 to 6 carbon atoms;

(c) The condensation product of material selected from the group consisting of
  (1) A monoester of a straight chain aliphatic diol with a saturated fatty acid, said diol containing from 3 to 5 carbon atoms and said saturated fatty acid having from about 14 to about 22 carbon atoms and
  (2) A partial fatty acid glyceride, containing an average of from 1 to 2 fatty acid radicals having from about 14 to about 22 carbon atoms but not more than enough unsaturated fatty acid radicals to give a condensation product having an iodine value of 60
  with a polycarboxylic acid having from 0 to 4 hydroxy groups, said polycarboxylic acid containing 3 to 6 carbon atoms and said condensation product having at least one free carboxyl group per molecule;

(d) The condensation product of a saturated straight chain fatty alcohol having from about 14 to about 22 carbon atoms with a dicarboxylic acid having no hydroxy groups and containing from 3 to 6 carbon atoms, said condensation product having at least one free carboxyl group per molecule;

(e) The condensation product of a saturated fatty acid having from about 14 to about 22 carbon atoms with a hydroxypolycarboxylic acid having from 1 to 4 hydroxy groups, said hydroxy polycarboxylic acid containing 3 to 6 carbon atoms and said condensation product having at least 1 free carboxyl group per molecule;

(f) Acid anhydrides of the preceding named acidic lipid materials (a) through (e);

(g) The condensation product of a monohydroxy-monocarboxylic acid having from 2 to 6 carbon atoms with a partial fatty acid glyceride containing an average of from 1 to 2 fatty acid radicals having from about 14 to about 22 carbon atoms;

(h) The dicarboxylic acid condensate of the condensation product of a monohydroxy-monocarboxylic acid having from 2 to 6 carbon atoms and a partial fatty acid glyceride containing an average of from 1 to 2 fatty acid radicals having from about 14 to about 22 carbon atoms, said dicarboxylic acid having no hydroxy groups and containing from 3 to 6 carbon atoms;

(i) The condensation product of a polycarboxylic acid having from 0 to 4 hydroxy groups and containing from 3 to 6 carbon atoms with a saturated straight chain fatty alcohol having from about 14 to about 22 carbon atoms and with a partial fatty acid glyceride containing an average of from 1 to 2 fatty acid radicals having from about 14 to about 22 carbon atoms;

(j) A monoester of a straight chain aliphatic diol with a saturated fatty acid, said diol containing from 3 to 5 carbon atoms and said saturated fatty acid having from about 14 to about 22 carbon atoms;

(k) A partial fatty acid glyceride containing an average of from 1 to 2 fatty acid radicals having from about 14 to about 22 carbon atoms;

(l) A substantially completely hydrogenated triglyceride containing fatty acid radicals having from about 14 to about 22 carbon atoms;

(m) A fatty acid glyceride containing an average of from 1 to 2 fatty acid radicals having from about 14 to about 22 carbon atoms and an average of from 1 to 2 fatty acid radicals having from 2 to 6 carbon atoms;

(n) The condensation product of a fatty acid glyceride containing an average of at least 1 fatty acid radical having from about 14 to about 22 carbon atoms and an average of at least 1 fatty acid radical having from 2 to 6 carbon atoms with a polycarboxylic acid having from 0 to 4 hydroxy groups, said polycarboxylic acid containing 3 to 6 carbon atoms and said condensation product having at least 1 free carboxyl group per molecule;

(o) A saturated fatty alcohol having from about 14 to about 22 carbon atoms;

(p) A hexitan ester of saturated fatty acids having from about 14 to about 22 carbon atoms and the polyoxyethylene derivatives of said ester; and (q) Mixtures of the preceding materials.

Specific examples of the preceding named classes of materials are set forth below by way of example only; and the invention is not to be limited to these specific materials.

A particularly desirable saturated fatty acid for the practice of this invention is stearic acid. Examples of other suitable fatty acids are myristic acid, palmitic acid, arachidic acid, and behenic acid. These fatty acids can be readily obtained from hydrogenated glycerides by saponification, acidulation, and isolation procedures. The fatty acid desired determines the choice of glyceridic material. For example, a technical grade of stearic acid can be obtained from hydrogenated soybean oil and a technical grade of behenic acid can be obtained from hydrogenated rapeseed oil.

Among the monohydroxy-monocarboxylic acids which are suitable for forming either monomeric or polymeric esters or condensation products with the aforesaid saturated fatty acids are the following: glycolic acid, lactic acid, sarcolactic acid, hydracrylic acid, 4-hydroxybutyric acid, 5-hydroxypentanoic acid, and 6-hydroxyhexanoic acid. The fatty acyl derivatives of the preceding named monohydroxy-monocarboxylic acids can be prepared by various methods, which includes acylation with fatty acid chlorides as described in U.S. Patent 2,251,695, granted to Tucker, August 5, 1941. One method for the preparation of fatty acid esters of polymeric monohydroxy-monocarboxylic acids which can be used in the practice of this invention is described in U.S. Patent 2,789,992, granted to Thompson and Buddemeyer, April 23, 1957.

Specific condensation products of polycarboxylic acids with the monoesters of diols or the partial fatty acid glycerides are the condensation product of malic, tartaric, citric, citramalic, trihydroxy glutaric, mucic, saccharic, mannosaccharic, malonic, succinic, glutaric, methyl succinic, dimethyl succinic, adipic, tricarballylic, maleic, fumaric, itaconic, mesaconic, citraconic, or aconitic acid with (a) a monoglyceride, a diglyceride, or a mixture of mono- and diglycerides containing fatty acid radicals of the preceding named fatty acids and, if desired, unsaturated, straight chain fatty acid radicals having from about 14 to about 22 carbon atoms, such as oleoyl, in sufficient quantities to raise the iodine value of the condensation product not higher than 60, or (b) a monoester of propylene glycol, 1,3-propanediol, 1,4-butanediol, 1,3-butanediol, or 1,5-pentanediol with any of the preceding named fatty acids. These condensation products can be prepared by esterifying polycarboxylic or hydroxy polycarboxylic acids with mono- and diglycerides, and/or mono-fatty acid esters of diols by direct esterification. This reaction is advantageously carried out in a mutual solvent such as dimethylformamide, dimethylacetamide, dioxane, xylene and toluene, either with or without the use of a catalyst such as sulfuric acid, p-toluene sulfonic acid, hydrogen chloride, zinc chloride, and other such catalysts. The preparations are best carried out with reaction temperatures in the range of from about 75° C. to about 175° C. with water being removed by evolution under reduced pressure or by azeotropic distillation. The desired condensation products are isolated by appropriate distillation, and/or washing, and/or crystallization treatments when required to remove solvents, excess reactants, and impurities. It is essential to the functioning of these materials that, in general, they contain one or more unesterified carboxyl groups per molecule.

The fatty alcohol esters of dicarboxylic acids include the condensation product of succinic, methyl succinic, dimethyl succinic, glutaric, malonic, adipic, maleic, or fumaric acids with saturated straight chain fatty alcohols containing from about 14 to about 22 carbon atoms, such as cetyl or stearyl alcohol, said condensation product being characterized by having at least 1 free carboxyl group per molecule. They can be prepared by the same procedures used to prepare the condensation products of polycarboxylic acids with either the monoesters of diols or the partial glycerides, using the appropriate fatty alcohols and dicarboxylic acids.

Examples of esters of hydroxy polycarboxylic acids and fatty acids which can be used in the shortening composition of this invention are the condensation products of malic, tartaric, citric, citramalic, trihydroxy glutaric, mucic, saccharic, or mannosaccharic acid with any of the preceding named fatty acids. These materials can be prepared by acylating the hydroxy polycarboxylic acids with fatty acid chlorides by reaction in appropriate solvents such as pyridine, quinoline, dioxane, dimethylformamide, dimethylacetamide and mixtures thereof, either with or without addition of lipid solvents such as chloroform, benzene, and ethyl ether. These reactions can be carried out over a wide temperature range of from about 0° C. to about 150° C. or higher as long as undesirable side reactions are avoided. Upon completion of the acylation reaction, the desired condensation products are isolated by dilution with an aqueous phase followed by washing, and/or distillation, and/or crystallization when required to remove solvents, excess reactants, and impurities. The method of U.S. Patent 2,251,695, granted to Tucker, August 5, 1941, is an example of such a procedure.

All of the preceding named specific esters and condensation products have at least one free carboxyl group per molecule. The acid anhydrides of these and related acidic lipid materials can be prepared by admixing the acidic lipid with an excess of acetic anhydride, cooling the reaction product, crystallizing the anhydride from the mixture of acetic acid and excess acetic anhydride and collecting the desired product by filtration. A useful method for preparing certain acid anhydrides is described in U.S. Patent 2,520,139, granted to Fuchs, August 29, 1950.

The aforesaid monohydroxy-monocarbocyclic acids can also be reacted with partial fatty acid glycerides to form suitable esters for use in combination with the hydrogenated vegetable phosphatide of this invention. For example, lactic acid and mono- and diglycerides of substantially completely hydrogenated soybean oil can be esterified under partial vacuum and elevated temperatures. Similar esters can also be prepared by reacting together glycerine, fatty acid, and monohydroxy-monocarboxylic acid by methods such as those described in U.S. Patent 2,690,971, granted to Iveson et al., October 5, 1954. As used herein, the term "lactic acid ester" refers to a condensation product containing esters of lactic acid and fatty acid with glycerine in which the fatty acid was approximately one-half palmitic acid and one-half stearic acid. Based on a series of analyses, the composition was approximately 36.4% monolactyl monofatty acid glyceride; 23.6% monolactyl difatty acid glyceride; 22.7% fatty acid diglyceride; 4.9% fatty acid monoglyceride; 4.5% fatty acid triglyceride; 4.2% free lactic acid; 3.7% lactyl glycerides; and a trace of free fatty acid.

The above condensate of lactic acid and hydrogenated soybean oil partial glycerides or the lactic acid ester can be reacted with an anhydride of a dicarboxylic acid such as succinic acid, to form a further condensation product which also can be used for the shortening and icing compositions of this invention.

Another surface active adjuvant material which can be used in combination with hydrogenated vegetable phosphatide in a fluid shortening to form excellent aerated icings is a product marketed under the trademark "Seqol 140." Chemically, it is a stearyl monoglyceridyl citrate which is formed by the esterification of citric acid with both a higher fatty alcohol and a mixture of mono- and diglycerides of higher fatty acids.

The diol monoesters of fatty acids which can be employed in this invention include propylene glycol monostearate; 1,3-propanediol monostearate; 1,4-butanediol monostearate; 1,3-butanediol monostearate; 1,5-pentanediol monostearate; and the corresponding monoesters of the preceding named diols with myristic acid, palmitic acid, arachidic acid, or behenic acid. The said diol monoesters can be prepared by direct esterification or interesterification of the diol by reaction with the desired fatty acid or a fatty ester of a monohydric or polyhydric alcohol under appropriate conditions of temperature, either with or without catalyst and/or solvent. In the direct reactions between fatty acid and diol, the reactants are normally mixed in ratios of 1 mole of fatty acid to .75 or more moles of diol. The yield of monoester is enhanced by using solvents such as dimethylformamide, dimethylacetamide, dimethylsulfoxide, xylene, or toluene; and catalysts such as p-toluene sulfonic acid, sulfuric acid, hydrogen chloride, or zinc chloride and other acidic or salt types are particularly effective in accelerating the rate of esterification.

Interesterification of the diol with fatty esters of alcohols such as methanol, ethanol, and propanol as well as fatty esters of polyhydric alcohols such as glycol, propylene glycol, 1,3-propanediol, 1,4-butanediol, glycerol, erythritol, ribitol, sorbitol, mannitol, and others is a particularly good path to the diol monoesters. Mutual solvents are useful in this reaction and include such materials as dimethylformamide, dimethylacetamide, dimethyl sulfoxide, dioxane, pyridine, xylene, and toluene. Catalysts of greatest value are such materials as sodium methoxide, benzyl trimethyl ammonium methoxide, sodium hydroxide and others described by Eckey, U.S. Patent 2,442,532, at column 24, line 18 et seq.

The reaction products containing diol monoester can be recovered by inactivation of the catalyst with an appropriate acid such as acetic or phosphoric acid. The reaction products can be freed of solvents by distillation and used as prepared, or they can be purified by water washing and crystallization techniques to further enrich the diol monoester content. Crystallization from an aliphatic hydrocarbon solvent such as hexane is particularly effective in enriching the monoester in the crystalline phase. Solvent partition methods are also highly effective in concentrating the diol monoesters.

The partial fatty acid glycerides used in the shortening composition of this invention can be either pure esters of fatty acids having from about 14 to about 22 carbon atoms, or mixtures of fatty acid esters containing such fatty acids. They are commonly made by reacting a triglyceride oil or fat, for example, cottonseed oil or soybean oil, with glycerine in the presence of a catalyst, usually an alkaline catalyst such as sodium hydroxide. U.S. Patents 2,206,167-8, granted to Edeler and Richardson, July 2, 1940, describe typical procedures for making edible monoglycerides and diglycerides. These materials contain on the order of 45% to 60% monoglyceride, the balance comprising diglyceride and a smaller percentage of triglycerides. The so-called "distilled" monoglyceride products which are characterized by having a higher monoglyceride content, commonly on the order of 90% or more, can also be used in the composition of this invention in combination with the hydrogenated vegetable phosphatide. Such products are marketed under the trademark "Myverol." Methods of manufacture thereof are described in U.S. Patents 2,634,278-9, 2,701,769, and 2,727,913.

The substantially completely hydrogenated triglycerides are triglycerides having iodine values of less than about 10 and can be prepared by hydrogenating naturally occurring oils such as cottonseed oil and soybean oil. They can also be crystallized from triglyceride fats and oils that have been subjected to random or directed rearrangement as described in U.S. Patent 2,442,531, granted to Eckey, June 1, 1949.

Acetylated mono- and diglycerides, such as those marketed under the trademark "Myvacet," and condensation products of these substances with polycarboxylic acids, such as succinic acid, are further examples of materials which can be used in combination with the hydrogenated vegetable phosphatide of this invention. The acetylated monoglycerides can be reacted with either malic, tartaric, citric, citramalic, trihydroxy glutaric, mucic, saccharic, mannosaccharic, malonic, succinic, glutaric, methyl succinic, dimethyl succinic, adipic, tricarballylic, maleic, fumaric, itaconic, mesaconic, citraconic, or aconitic acid to form suitable condensation products.

Suitable alcohols of the higher fatty acids for use in this invention can be prepared by the catalytic hydrogenation of the corresponding acids, esters, or glycerides. For example, palmityl and stearyl alcohols can be formed from palmitic and stearic acids, respectively, by this method.

The fatty acid esters of hexitans (known commercially as the "Spans") can be prepared by esterifying hexitol anhydrides with fatty acids, such as palmitic and stearic, as described in U.S. Patents 2,322,820-1, granted to Brown, June 29, 1943; and the polyoxyethylene derivatives of said hexitan esters (known commercially as the "Tweens") can be prepared by adding polyoxyethylene chains to the nonesterified hydroxyls as described in U.S. Patent 2,380,166, granted to Griffin, July 10, 1945.

Although specific methods of preparing the aforesaid additives have been described herein, it is not intended that the invention should be limited to any particular method of preparation of these materials.

The preceding surface active adjuvant materials are specific examples of edible high molecular weight saturated carboxylic acids and esters, acid anhydrides of acidic lipids, and saturated fatty alcohols which can be used in combination with hydrogenated vegetable phosphatide in a fluid shortening to give stable, aerated icings. Although some of these materials previously have been known to be used in fatty compositions such as shortenings, cake mixes, icings, toppings, and the like, it has not heretofore been known to combine these materials with substantially hydrogenated vegetable phosphatide in the proportions described to form the stable fluid shortening of this invention which has the excellent cream-type icing properties described herein. The icing performance of the combined stabilizers additives of this invention has been found to be substantially superior to that produced by the use of the additives individually in a fluid shortening.

The stabilizer additives of this invention can be incorporated in the shortening composition by mixing them into the liquid triglyceride base oil. For the preparation of a stable suspension of the additives in the base oil, it is preferable to process the shortening composition according to the teaching of U.S. Patent 2,815,286, granted to Andre and Going, December 3, 1957. The main steps can include heating the shortening composition to a temperature high enough to melt all the solids, rapidly chilling to form small crystals, and then warming to between 90° F. and 100° F. (32° to 38° C.) to promote a change of the solid triglyceride fat from the alpha and beta-prime phases to a beta phase, either with or without "seeding" with beta phase crystals. An alternative method is to warm the rapidly chilled mixture to a temperature above the melting point of the alpha and beta-prime phases but below the melting point of the beta phase crystals, and then cooling the mixture, using the beta phase crystals already present as "seed" crystals. An added tempering step for the shortening of this invention of 1 to 2 days at 80° F. to 90° F. (27° to 32° C.), after packing, is desirable. This process results in forming a stable suspension of the undissolved additives in the base oil.

Although this invention particularly relates to fluid shortening, it should be understood that the use of substantially completely hydrogenated triglycerides of higher fatty acids in amounts greater than about 8% will cause the shortening to become very viscous and somewhat plastic at normal room temperatures. Such a product shows suitable cream icing performance, but would not be suitable for use where a shortening having the definite advantages in handling and storage of a fluid shortening is desired.

Various other additives can be used in the shortenings of this invention so long as they have no qualities which would make them harmful to the health or aesthetically undesirable. It will be recognized, however, that the presence of other additives may have an adverse effect upon the stabilizer of this invention and, therefore, the desirability of the use of other additives will depend upon the overall shortening qualities desired.

Various minor ingredients such as: flavor; coloring; antioxidants, such as butylated hydroxytoluene, butylated hydroxyanisole, citric acid, and methyl silicone; and mold inhibitors, such as sorbic acid and sodium benzoate can also be added to the shortening of this invention if desired.

The following examples further illustrate the shortening of this invention, but the invention is not limited to these specific examples. "Specific volume" is defined in these examples as the reciprocal of density in grams per milliliter.

EXAMPLE 1

A stable fluid shortening was prepared by mixing together the following materials in the stated amounts:

| | Percent by weight |
|---|---|
| Refined and bleached cottonseed oil | 94 |
| Hydrogenated vegetable phosphatide | 4 |
| Stearic acid | 2 |

The hydrogenated vegetable phosphatide was a hydrogenated commercial lecithin having the following analysis: iodine value—14.48; acid value—27.13; hydroxyl value—156.8; percent total fatty acid—71.2; percent phosphorus as $PO_4$—2.03.

The above fluid shortening was used to prepare a cream-type icing consisting of the following ingredients:

| | Parts by weight |
|---|---|
| Shortening | 80 |
| Sodium chloride | 2 |
| Non-fat dry milk | 20 |
| Water | 56 |
| 4X powdered sugar | 320 |

The said icing ingredients were mixed with a Hobart C-100 model electric mixer at No. 1 speed for about 5 minutes and then whipped at No. 2 speed for about 10–15 minutes. An excellent cream-type icing was formed which had firm body and very little slump or leakage of oil after standing for 30 minutes. The icing had a specific volume of 1.41. By way of comparison, several other shortening compositions showed the following results when used to prepare a cream-type icing according to the above procedures:

*Table I*

| Shortening Composition in Percent by Weight | | | Icing, Specific Volume | Icing Density (g./ml.) | Other Icing Characteristics |
|---|---|---|---|---|---|
| Refined, Bleached Cottonseed Oil | Hydrogenated Lecithin | Stearic Acid | | | |
| 100 | 0 | 0 | 0.81 | 1.24 | Rapid phase separation. |
| 96 | 0 | 4 | 0.81 | 1.24 | Do. |
| 96 | 4 | 0 | 1.30 | 0.77 | Very soft. |
| 94 | 4 | 2 | 1.41 | 0.71 | Good body, very firm. |

The above results illustrate the superior icings obtained with a shortening containing the stabilizer combination of this invention. These icings have a large volume, good body, and are very firm.

EXAMPLE 2

A comparison was made between a shortening composition of this invention (consisting of refined, bleached cottonseed oil, stearic acid, and the hydrogenated lecithin described in Example 1) and several other shortenings in which the hydrogenated lecithin was replaced with either hydroxylated lecithin ("Centrolene S") or commercial lecithin which had not been substantially hydrogenated ("Centrolex P"). These shortenings were used to prepare cream-type icings according to the procedure described in Example 1. The following table shows the results obtained with these icings.

*Table II*

| Shortening Composition in Percent by Weight | | | | | Icing, Specific Volume | Other Icing Characteristics |
|---|---|---|---|---|---|---|
| Refined, Bleached Cottonseed Oil | Stearic Acid | Hydrogenated Lecithin | Hydroxylated Lecithin [1] | Commercial Lecithin [2] | | |
| 96 | 4 | 0 | 0 | 0 | 0.81 | Rapid phase separation. |
| 92 | 4 | 4 | 0 | 0 | 1.39 | Very good body. |
| 92 | 4 | 0 | 4 | 0 | 0.78 | Very soft icing. |
| 92 | 4 | 0 | 0 | 4 | 0.79 | Do. |

[1] Analysis: Iodine value—89.3; acid value—29.7; hydroxyl value—148.8; percent total fatty acid—71.6; percent phosphorus as $PO_4$—5.14.
[2] Analysis: Iodine value—83.8; acid value—28.7; hydroxyl value—133.7; percent total fatty acid—56.4; percent phosphorus as $PO_4$—6.45.

The above results clearly show the superiority of hydrogenated lecithin over either commercial lecithin or hydroxylated lecithin in the shortening and icing compositions of this invention.

EXAMPLE 3

Example 2 was repeated except that the stearic acid surface active adjuvant was replaced with either (a) stearoyl polylactic acid containing the moiety of an average of from about 0.5 to about 2 mols of lactic acid in the molecule; (b) lactic acid ester hydrogen succinate; (c) the acid anhydride of a glutaric acid ester of the mono- and diglycerides of substantially completely hydrogenated soybean oil having an iodine value of 8; or (d) stearoyl propylene glycol hydrogen succinate.

The following table shows the icing results obtained with these compositions:

*Table III*

| Shortening Composition in Percent By Weight | | | | | Icing Characteristics | |
|---|---|---|---|---|---|---|
| Base Oil | Surface Active Adjuvant | Hydrogenated Lecithin | Hydroxylated Lecithin | Commercial Lecithin | Specific Volume | Firmness and Body |
| 96 | (a)4 | 0 | 0 | 0 | 1.25 | Very soft. |
| 92 | (a)4 | 4 | 0 | 0 | 1.64 | Firm. |
| 92 | (a)4 | 0 | 4 | 0 | 1.45 | Very soft. |
| 92 | (a)4 | 0 | 0 | 4 | 1.31 | Do. |
| 96 | (b)4 | 0 | 0 | 0 | 1.41 | Do. |
| 92 | (b)4 | 4 | 0 | 0 | 1.54 | Very firm. |
| 92 | (b)4 | 0 | 4 | 0 | 1.37 | Very soft. |
| 92 | (b)4 | 0 | 0 | 4 | 1.31 | Do. |
| 96* | (c)4 | 0 | 0 | 0 | 1.06 | Soft. |
| 92 | (c)4 | 4 | 0 | 0 | 1.31 | Very firm. |
| 92 | (c)4 | 0 | 4 | 0 | 1.31 | Soft; unstable. |
| 92 | (c)4 | 0 | 0 | 4 | 1.18 | Do. |
| 96* | (d)4 | 0 | 0 | 0 | 1.28 | Do. |
| 92 | (d)4 | 4 | 0 | 0 | 1.59 | Very firm. |
| 92 | (d)4 | 0 | 4 | 0 | 1.01 | Fluid. |
| 92 | (d)4 | 0 | 0 | 4 | 0.93 | Do. |

* The base oil in these two shortenings consisted of:
  89% partially hydrogenated soybean oil having an iodine value of about 107;
  2% substantially completely hydrogenated soybean oil having an iodine value of about 8;
  1% stearic acid; and
  8% of an interesterification product of propylene glycol and substantially completely hydrogenated soybean oil having an iodine value of about 8, which consisted of about 55% to 65% propylene glycol monostearate and 35% to 45% of a mixture of propylene glycol distearate, mono-, di-, and triglyceride, and free fatty acid.
  Based on a series of analyses, the said base oil contained about 5.17% propylene glycol monostearate; 2.79% free fatty acid and diglyceride; 0.40% monoglyceride; and 1.35% free fatty acid. In all the other shortenings of this example the base oil consisted of refined, bleached cottonseed oil.

Examples 4 to 24, below, illustrate several other shortening compositions of this invention from which cream icings of good stability and firmness were prepared. In each of these examples, the hydrogenated lecithin was material of the same analysis described in Example 1; and the icings were prepared according to the procedure described in that example.

EXAMPLE 4

A fluid shortening consisting of 92% cottonseed oil, 4% hydrogenated lecithin, 2% stearic acid and 2% substantially completely hydrogenated soybean oil having an iodine value of 8 was used to prepare a cream icing having a specific volume of 1.21.

EXAMPLE 5

A fluid shortening consisting of 88% cottonseed oil, 4% hydrogenated lecithin and 8% stearic acid was used to prepare a cream icing having a specific volume of 1.14.

EXAMPLE 6

A fluid shortening consisting of 94% cottonseed oil, 4% hydrogenated lecithin and 2% substantially completely hydrogenated soybean oil having an iodine value of 8 was used to prepare a cream-type icing having a specific volume of 1.12.

EXAMPLE 7

A fluid shortening consisting of 91% cottonseed oil, 4% hydrogenated lecithin, 2% stearic acid and 3% stearoyl propylene glycol hydrogen succinate was used to prepare a cream icing having a specific volume of 1.47.

EXAMPLE 8

A fluid shortening consisting of 90% cottonseed oil, 4% hydrogenated lecithin, 2% stearic acid and 4% of the succinic acid ester of "Myvacet 5–00" (acetylated mono- and diglycerides) was used to prepare a cream-type icing having a specific volume of 1.72.

EXAMPLE 9

A fluid shortening consisting of 90% cottonseed oil, 4% hydrogenated lecithin, 2% stearic acid and 4% mono- and diglycerides of substantially completely hydrogenated soybean oil having an iodine value of 8 was used to prepare a cream-type icing having a specific volume of 1.61.

EXAMPLE 10

A fluid shortening consisting of 90% cottonseed oil, 4% hydrogenated lecithin, 2% stearic acid and 4% octadecyl hydrogen succinate was used to prepare a cream-type icing having a specific volume of 1.47.

EXAMPLE 11

A fluid shortening consisting of 90% cottonseed oil, 4% hydrogenated lecithin, 2% stearic acid and 4% of 1,3-distearin hydrogen succinate was used to prepare a cream-type icing having a specific volume of 1.45.

EXAMPLE 12

A fluid shortening consisting of 90% cottonseed oil, 4% hydrogenated lecithin, 2% stearic acid and 4% malic stearate was used to prepare a cream-type icing having a specific volume of 1.00. Although this icing did not have as large a specific volume as those in the preceding examples, it was substantially better than the volume obtained without the additives; and the icing had a very firm body.

EXAMPLE 13

A fluid shortening consisting of 90% cottonseed oil, 4% hydrogenated lecithin, 2% stearic acid and 4% stearoyl polylactic acid containing the moiety of an average of from about 0.5 to about 2 mols of lactic acid in the molecule was used to prepare a cream-type icing having a specific volume of 1.72.

EXAMPLE 14

A fluid shortening consisting of 90% cottonseed oil, 4% hydrogenated lecithin, 2% stearic acid and 4% of the acid anhydride of the stearoyl polylactic acid described in the previous example was used to prepare a cream-type icing having a specific volume of 1.72.

EXAMPLE 15

A fluid shortening consisting of 94% cottonseed oil, 4% hydrogenated lecithin, 1% cetyl alcohol and 1% stearyl alcohol was used to prepare a cream-type icing having a specific volume of 1.41.

EXAMPLE 16

A fluid shortening consisting of 88% cottonseed oil, 4% hydrogenated lecithin, 4% cetyl alcohol and 4% stearyl alcohol was used to prepare a cream-type icing having a specific volume of 1.72.

EXAMPLE 17

A fluid shortening consisting of 90% cottonseed oil, 4% hydrogenated lecithin, 2% stearic acid and 4% lactic acid ester hydrogen succinate was used to prepare a cream-type icing having a specific volume of 1.64.

EXAMPLE 18

A fluid shortening consisting of 94% cottonseed oil, 2% hydrogenated lecithin and 4% lactic acid ester hydrogen succinate was used to prepare a cream-type icing having a specific volume of 1.44.

EXAMPLE 19

A fluid shortening consisting of 90% cottonseed oil, 2% hydrogenated lecithin and 8% lactic acid ester hydrogen succinate was used to prepare a cream-type icing having a specific volume of 1.40.

EXAMPLE 20

A fluid shortening consisting of 84% cottonseed oil, 12% hydrogenated lecithin and 4% lactic acid ester hydrogen succinate was used to prepare a cream-type icing having a specific volume of 1.59.

EXAMPLE 21

A fluid shortening consisting of 84% cottonseed oil, 12% hydrogenated lecithin, and 4% stearic acid was used to prepare a cream-type icing having a specific volume of 1.37.

EXAMPLE 22

A fluid shortening consisting of 94% cottonseed oil, 2% hydrogenated lecithin, and 4% stearic acid was used to prepare a cream-type icing having a specific volume of 1.10.

Good cream-type stable icings of comparable volume and firmness are obtained when propylene glycol monostearate, malic stearate anhydride, stearic anhydride, stearoyl sorbitan succinate anhydride, stearoyl propylene glycol succinate anhydride, "Seqol 140," "Tween 60," "Span 60," or "Myvacet 5–00" are substituted for the stearic acid in Example 22, above.

When peanut oil, rapeseed oil and other glyceride oils containing fatty acid radicals having from about 14 to about 22 carbon atoms are substituted for the cottonseed and soybean oils in the above examples, substantially similar fluid shortenings are obtained.

When myristic acid, oleic acid and behenic acid are substituted for the stearic and palmitic acids in the surface active adjuvants of the icing stabilizer in the above examples, comparable improvement in the specific volume and firmness of icing is obtained.

When 1% hydrogenated lecithin is substituted for 2% hydrogenated lecithin in the above examples, comparable high-volume, stable cream icing performance is obtained.

Certain combinations of surface active adjuvants with the hydrogenated vegetable phosphatide are preferred over a single surface active adjuvant. For example, a preferred embodiment of the fluid shortening of this invention comprises partially hydrogenated soybean oil having an iodine value of from about 100 to about 120, and containing therein as additives: from about 1% to about 4% hydrogenated vegetable phosphatide having an iodine value of less than about 30, from about 1% to about 5% stearic acid, from about 1% to about 5% substantially completely hydrogenated triglyceride containing fatty acid radicals having from about 14 to about 22 carbon atoms, from about 1% to about 5% partial fatty acid glyceride containing an average of from 1 to 2 fatty acid radicals having from about 14 to about 22 carbon atoms and from about 1% to about 5% of a monoester of a straight chain aliphatic diol with a saturated fatty acid, said diol containing from 3 to 5 carbon atoms and said saturated fatty acid containing from about 14 to about 22 carbon atoms, the total weight of said additives not exceeding about 16% by weight of the shortening.

The fluid shortening of this invention is also suitable for conventional shortening purposes, such as the baking of cakes and the like. As an example, a cake was prepared by mixing together the following ingredients:

| | Parts by weight |
|---|---|
| Liquid shortening | 47.5 |
| Granulated sugar | 133.0 |
| Cake flour | 107.0 |
| Sodium chloride | 2.5 |
| Double acting baking powder | 6.8 |
| Whole milk | 130.0 |
| Egg whites (fresh) | 60.0 |

The liquid shortening and the dry ingredients were placed in a mixing bowl and then about 70% of the whole milk was mixed in with a Sunbeam mixer at a speed of 500 r.p.m. for 2 minutes. The batter was scraped down and the egg whites and balance of the whole milk were added. Mixing was then continued at the same speed for an additional two minutes. 400 grams of the batter were placed in an 8-inch pan and baked in an oven at 365° F. (185° C.) for about 25 minutes.

The shortening consisted of 2% hydrogenated lecithin and 98% of a base oil made up as follows:

89% partially hydrogenated soybean oil having an iodine value of about 107;
2% substantially completely hydrogenated soybean oil having an iodine value of about 8;
1% stearic acid; and
8% of an interesterification product of propylene glycol and substantially completely hydrogenated soybean oil having an iodine value of about 8, which consisted of about 55% to 65% propylene glycol monostearate and 35% to 45% of a mixture of propylene glycol distearate, mono-, di-, and triglycerides, glycerol, and free fatty acid.

The cake had a hot volume of 1630 cc. and a cold volume of 1330 cc. per 400 g. batter. The hot volume was measured immediately after the completion of the baking period and the cold volume 20 minutes thereafter. The cake was also characterized by a fine grain and had good eating qualities.

What is claimed is:

1. A fluid shortening composition, suitable for the preparation of cream-type icings, which comprises a normally liquid glyceride base oil containing, by weight of the composition, an icing stabilizer combination of from about 1% to about 12% hydrogenated vegetable phosphatide having an iodine value of less than about 30 and from about 1% to about 12% of at least one surface active adjuvant selected from the group consisting of edible high molecular weight saturated fatty acids, esters of edible low molecular weight hydroxy compounds and said fatty acids, acid anhydrides of edible high molecular weight acidic lipids, and edible high molecular weight saturated fatty alcohols, the total weight of said icing stabilizer combination not exceeding about 16% by weight of the shortening composition.

2. The composition of claim 1 in which the hydrogenated vegetable phosphatide is commercial lecithin hydrogenated to an iodine value of less than about 30.

3. The composition of claim 1 in which the surface active adjuvant is distearin hydrogen succinate.

4. The composition of claim 1 in which the surface active adjuvant is stearic acid.

5. The composition of claim 1 in which the surface active adjuvant is stearoyl polylactic acid containing the moiety of an average of from about 0.5 to about 2 mols of lactic acid in the molecule.

6. The composition of claim 1 in which the surface active adjuvant is stearoyl propylene glycol hydrogen succinate.

7. The composition of claim 1 in which the surface active adjuvant is the succinic acid ester of a lactic acid condensate of glycerol and fatty acid having from 14 to about 22 carbon atoms.

8. The composition of claim 1 in which the normally liquid glyceride base oil is partially hydrogenated soybean oil having an iodine value of from about 100 to about 120.

9. A fluid shortening composition, suitable for the preparation of cream-type icings, which comprises a normally liquid glyceride base oil containing, by weight of the composition, an icing stabilizer combination of from about 1% to about 12% hydrogenated vegetable phosphatide having an iodine value of less than about 30 and from about 1% to about 12% of at least one surface active adjuvant of the general formula:

$$R_m(-CO.O-)_n(-COOH)_p(-OH)_q(-CO.O.CO-)_rX_s$$

wherein:

R is selected from the group consisting of saturated and olefinically unsaturated hydrocarbon radicals having from about 13 to about 21 carbon atoms, X is a residue having from 1 to 6 carbon atoms derived from at least one member of the group consisting of mono- and polyhydric alcohol, mono- and polycarboxylic acid, and hydroxy mono- and polycarboxylic acid, $m = 1$ to 6,
$n = 0$ to 10,
$p = 0$ to 2,
$q = 0$ to 4,
$r = 0$ to 2,
$s = 0$ to 6, and at least one of $n$, $p$, $q$, $r$, and $s$ is at least one, the total weight of said icing stabilizer combination not exceeding about 16% by weight of the shortening composition.

10. A fluid shortening composition, suitable for the preparation of cream-type icings, which comprises a base oil of partially hydrogenated soybean oil having an iodine value of from about 100 to about 120 and containing as additives therein, by weight of the composition, from about 1% to about 4% hydrogenated vegetable phosphatide having an iodine value of less than about 30, from about 1% to about 5% stearic acid, from about 1% to about 5% substantially completely hydrogenated triglyceride containing fatty acid radicals having from about 14 to about 22 carbon atoms, from about 1% to about 5% partial fatty acid glyceride containing an average of from 1 to 2 fatty acid radicals having from about 14 to about 22 carbon atoms and from about 1% to about 5% of a monoester of a straight chain aliphatic diol with a saturated fatty acid, said diol containing from 3 to 5 carbon atoms and said saturated fatty acid containing from about 14 to about 22 carbon atoms, the total weight of said icing stabilizer additives not exceeding about 16% by weight of the shortening composition.

11. A cream icing of the type comprising a mixture of sugar, water, and fluid shortening, containing as additives therein, by weight of the shortening, an icing stabilizer combination of from about 1% to about 12% hydrogenated vegetable phosphatide having an iodine value of less than about 30 and from about 1% to about 12% of at least one surface active adjuvant of the general formula:

$$R_m(-CO.O-)_n(-COOH)_p(-OH)_q(-CO.O.CO-)_rX_s$$

wherein:

R is selected from the group consisting of saturated and olefinically unsaturated hydrocarbon radicals having from about 13 to about 21 carbon atoms, X is a residue having from 1 to 6 carbon atoms derived from at least one member of the group consisting of mono- and polyhydric alcohol, mono- and polycarboxylic acid, and hydroxy mono- and polycarboxylic acid, $m = 1$ to 6,
$n = 0$ to 10,
$p = 0$ to 2,
$q = 0$ to 4,
$r = 0$ to 2,
$s = 0$ to 6, and at least one of $n$, $p$, $q$, $r$, and $s$ is at least one, the total weight of said icing stabilizer combination not exceeding about 16% by weight of the shortening composition.

References Cited by the Examiner

UNITED STATES PATENTS

| | | | |
|---|---|---|---|
| 2,494,771 | 1/50 | Markley | 99—118 |
| 2,532,523 | 12/50 | Trempel et al. | 99—118 |
| 2,870,197 | 1/59 | Jacini | 260—403 |
| 2,874,175 | 2/59 | Fenge et al. | 260—404.8 |
| 2,973,270 | 2/61 | Thompson et al. | 99—118 X |

A. LOUIS MONACELL, *Primary Examiner.*